United States Patent [19]
Kohler

[11] 3,854,138
[45] Dec. 10, 1974

[54] RADIOLOCATION SYSTEM PARTICULARLY ADAPTED FOR AIRCRAFT LANDING SYSTEMS

[75] Inventor: Karl Kohler, Heimerdingen, Germany

[73] Assignee: International Standard Electric Corporation, New York, N.Y.

[22] Filed: May 17, 1973

[21] Appl. No.: 361,223

[30] Foreign Application Priority Data
May 18, 1972 Germany............................ 2224400

[52] U.S. Cl.......... 343/108 R, 343/102 R, 343/115, 343/120
[51] Int. Cl............................................. G01s 1/16
[58] Field of Search............ 343/108 R, 102 R, 115, 343/120

[56] References Cited
UNITED STATES PATENTS
3,634,862   1/1972   Hiscox et al. .................. 343/108 R
3,665,468   5/1972   Fleming et al. ..................... 343/102
3,704,465   11/1972  Masak et al. ....................... 343/102

Primary Examiner—Malcolm F. Hubler
Assistant Examiner—S. C. Buczinski
Attorney, Agent, or Firm—William T. O'Neil

[57] ABSTRACT

A radiolocation system especially adapted for aircraft landing, including a commutated ground beacon array which successfully radiates energy of equal phase and which provides for air-derived positional information. The vectors of the received (pulses) from the successively energized ground array elements are added and the resulting values are stored for examination to determine the maximum value of a "virtual" beam pattern comparable to the pattern which would be obtained from the same array with all elements energized to form a beam (group pattern). Means are provided for adding phase increments to the vectors to angularly shift the computed "virtual" pattern thereby providing for pilot selection of glide and/or localizer paths.

3 Claims, 17 Drawing Figures 3,854,138

RADIOLOCATION SYSTEM PARTICULARLY ADAPTED FOR AIRCRAFT LANDING SYSTEMS

BACKGROUND OF THE INVENTION

1. Field of the Invention

The present invention relates generally to aircraft radio navigation and, more particularly, to systems using commutated array ground radio beacon arrangements and providing air-derived course and/or glide-slope deviation information.

2. Description of the Prior Art

The ground stations of the known and widely used instrument landing system (ILS) operate either by the one-carrier method or by the two-carrier method. These systems are essentially ground radio beacons which lay radio "tracks" for aircraft landing guidance in both azimuth (localizer) and elevation (glide-path) modes. Operating with one carrier frequency are those radio beacons having non-directional patterns and also certain ground stations having directional patterns with side lobes.

In the two-carrier method, two linear antenna arrays are arranged to radiate two directional radiation patterns, one of which (the so-called course pattern) covers a narrow angular range on each side of the invariable course line. This serves to indicate to the pilot the deviation from on-course, while the other, the so-called clearance pattern, indicates to the pilot, if the aircraft is outside the range of the course pattern, and on which side of the course line the aircraft is. It thus serves to provide, within that range, a defined condition of the deviation indicator aboard the aircraft, namely one of the two end positions. The above-mentioned directional radiation patterns may also be referred to as group or simultaneous patterns because they emanate from several simultaneously radiating radiators forming an array with a predetermined radiation pattern.

The ILS system is known to be relatively easily affected by errors caused by multipath propagation. This applies to both the localizer portion and the glide-path portions. The two-carrier method is less easily affected than the one-carrier method, but, nevertheless, leaves much to be desired in that respect.

Also known are landing systems with selectable approach angle. One such system, using in terferometer techniques, is described in U.S. Pat. No. 3,634,862.

A ground station similar to that of the invention is known in other systems such as Doppler fixing systems, for example, that described in U.S. Pat. No. 3,626,419. There, however, the successive connection of the radiators of the linear antenna array serves to produce a Doppler frequency which, in the invention, is not evaluated at the receiving end.

In the United States patent application, Ser. No. 220,982, filed Jan. 26, 1972 by the present inventor, radiators of a linear antenna array are caused to radiate sequentially, so that the different phases can be added in the airborne station. The determination of vectors and their vectorial addition is not described therein.

In another United States patent application, Ser. No. 326,513, filed Jan. 24, 1973 by the present inventor, radiators of a linear array are connected successively, as in the present invention. However, the onboard evaluation of the received pulses is performed by method and apparatus other than the novel means of the present invention.

SUMMARY OF THE INVENTION

The invention herewith described has for its general object the provision of a completely new radiolocation system in which part of the errors caused by multipath propagation are eliminated through unique signal processing in the receiver aboard the aircraft.

The novel system also permits the approach angle to be selected by "virtual" rotation of the radiation patterns extending in the direction of the receiver.

In group patterns systems (patterns produced by multi-element arrays of simultaneously energized elements), part of the error caused by multipath propagation results from reflected clearance radiation. This part does not exist in connection with the virtual patterns produced by a commutated array at the ground station, since only one radiator is radiating at a particular instant. Accordingly, ineraction of the radiators can be completely avoided by inserting switched diodes into the feeders at suitable points. In addition, only one linear array and one frequency are necessary vis-a-vis the interferometer and certain other systems. The present novel system is suitable for simulating one- and two-carrier methods.

The disclosures of the aforementioned U.S. Pat. No. 3,626,419 and United States patent application Ser. Nos. 220,982 and 326,513 are incorporated herein by reference.

DESCRIPTION OF THE PREFERRED EMBODIMENT

First, the operation of the system will be explained with reference to FIGS. 1 to 6, e.g., for an approach course according to the pertinent ICAO (International Civil Aviation Organization) Standard.

Figure 1:
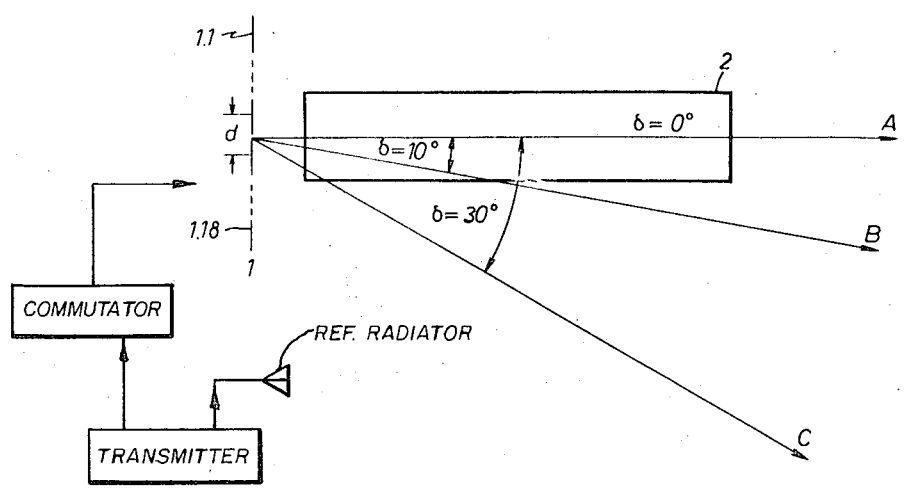
FIG. 1 shows schematically a runway, a linear antenna array consiting of $n = 18$ radiators, and three receiver positions.

In FIG. 1, the reference numeral 2 designates a runway plan view. Arranged at one end is a horizontal antenna array 1 having idential plural radiators 1.1 to 1.18, aligned linearly. For this explanation, the spacing d between the radiators, represented as dipoles, is taken as one-half the operating wavelength $\lambda$, i.e., $d = \lambda/2$. Three approach angles or airborne receiver angular positions A ($\delta = 0°$), B ($\delta = 10°$), and C ($\delta = 30°$) are shown. The radiators 1.1 to 1.18 are successively connected to a transmitter (not shown) and radiate pulses containing an r.f. oscillation whose amplitude and phase are the same for all radiators. This type of antenna operation is the same as that provided in so-called Doppler navigation beacon arrangements described, for example, in U.S. Pat. No. 3,626,419, entitled Doppler Navigation System. Prior to each radiation cycle, a reference pulse train is radiated over the radiator 1.1.

At the airborne receiver, the pulses resulting from ground array commutation are processed at the rate at which the radiators of the linear antenna array are energized. When the reference pulse train appears (reset), it is determined that the pulse from radiator 1.1 follows next, so that an unambiguous assignment of the received pulses to the corresponding radiators is obtained. If the pulse received from radiator 1.1 is chosen as the phase reference pulse, the phase $\psi 2$ to $\psi 18$ of the pulses received from radiators 1.2 to 1.18 can be measured relative to the phase $\psi 1$ of the reference pulse with the aid of a phase meter provided in the receiver. Likewise, the amplitudes A2 to A18 of the received pulses can be measured relative to the amplitude A1 of the reference pulse. For the following explanation, it is assumed that there are no wave interferences acting to modify the pattern of received energy at the airborne station. Accordingly, the amplitudes A2 to A18 all assume the value of the amplitude A1. For explanation, this value is arbitrarily assumed to be 1.

Since, as aforementioned, each pulse can be unambiguously identified with a corresponding radiator, a number couple consisting of magnitude (amplitude) and phase is thus obtained for each pulse in the receiver. Each number couple represents a complex number or vector. This complex number represents the received field strength which the respective radiator produces at the receiver relative to that received from the reference radiator. Since the pulse coming from radiator 1.1 is the reference pulse, the associated number couple always has phase 0 for all receiver positions. The phases of the number couples for the pulses from the other radiators depend on the receiver positions.

The measured field strength, i.e., the determined vectors of the pulses from all radiators, are stored in the airborne receiver. In a manner to be explained hereinbelow, all that information is obtained from the individual measured values (vectors) which has an effect equivalent to that derived from the signal received from the simultaneously radiating course and clearance antennas, namely course carrier, course sideband, clearance carrier, and clearance sideband of the known prior art ILS system.

First, it will be explained how equivalent clearance information is obtained in the invention. For clarity, use will be made of vector representation.

The clearance information is derived from the clearance carrier and the clearance sideband. The clearance carrier will be dealt with first. For obtaining the clearance carrier, only those stored measured values are evaluated which are received from the radiators 1.9 and 1.10.

Figure 2A:
FIGS. 2a to 2c shows, for the airborne receiver station angular positions illustrated in FIG. 1, the vectors and their sums successively determined in the air during a scanning cycle, for obtaining the clearance carrier from the pulses originating from the radiators 1.9 and 1.10 of the linear array.
Figure 2A:
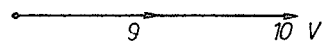
Figure 2B:
Figure 2B:
Figure 2C:
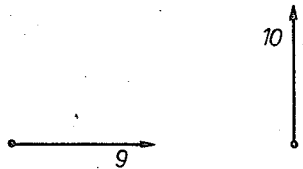
Figure 2C:
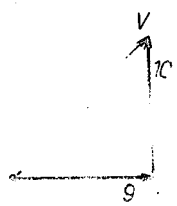
Figure 3A:
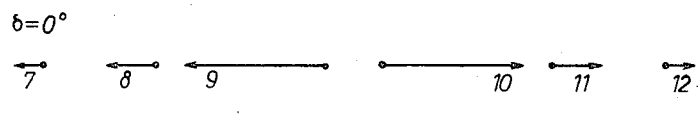
FIGS. 3a to 3c show, for the receiver positions of FIG. 1, the vectors and their sums successively determined at an airborne receiving station during a scanning cycle for obtaining the clearance sideband from the pulses originating from the radiators 1.7 to 1.12 of the linear array.
Figure 3B:
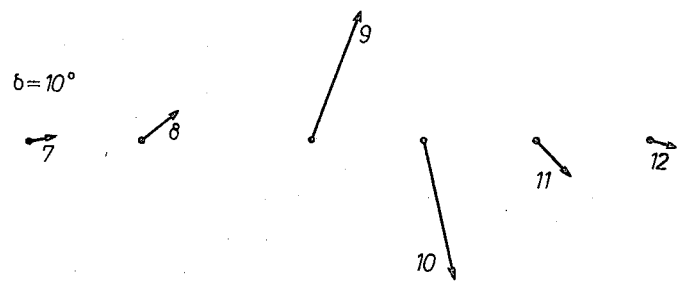
Figure 3B:
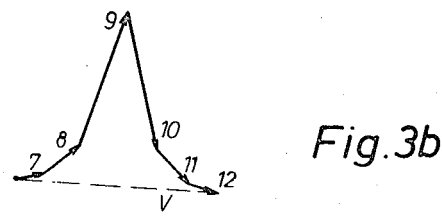
Figure 3C:
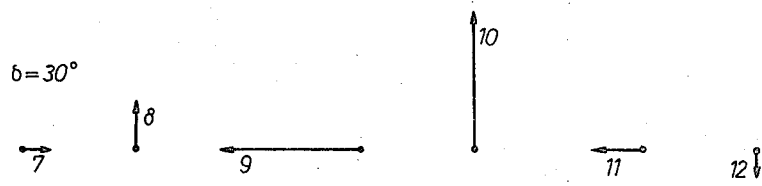
Figure 3C:
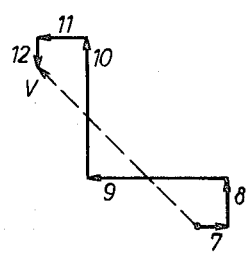

FIGS. 2a through 2c show the vectors of the clearance carrier for the receiver positions A ($\delta = 0°$), B ($\delta = 10°$) and C ($\delta = 30°$) in accordance with FIG. 1. The numbers along the vectors are those of the radiators.

Figure 4:
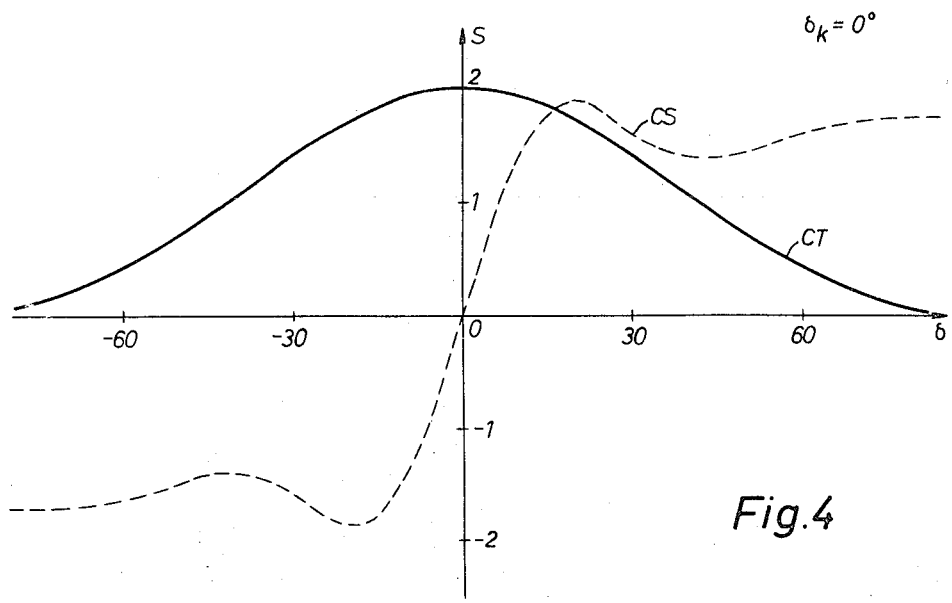
FIG. 4 shows the real group patterns of the clearance carrier and clearance sideband or the corresponding virtual patterns.

If the radiators 1.9 and 1.10 of the linear antenna array of FIG. 1 were caused to radiate simultaneously and with equal phase and amplitude, a real group pattern according to curve CT of FIG. 4 would be obtained in space. That curve shows the group pattern of the clearance carrier on both sides of the course line $\delta = 0°$. The main lobe of such a group pattern would lie in the direction $\delta = 0°$.

However, since the radiators are energized sequentially, this group pattern never exists in space, rather only the pattern of, in each case, a single radiator exists. From the successively received pulses and the single-pattern vectors determined therefrom, the airborne receiver can nevertheless determine those values of the real group pattern which are associated with its position by forming the absolute value of the sum of the vectors of the pulses from the radiators 1.9 and 1.10. The receiver, therefore, contains a device which adds the vectors and determines the absolute value of the vector sum. This is to be regarded as an important and basic aspect of the invention.

In each of FIGS. 2a to 2c, the individual vectors and their addition is shown. In each case, the vector sum is designated V.

In reaching a receiver in position A ($\delta = 0°$) (See FIG. 1), all pulses from radiators 1.9 and 1.10 cover the same distance (FIG. 2a). Since the r.f. signal within each pulse was radiated in phase with the reference, it must arrive in phase. All vectors, therefore, have the phase 0. The absolute value S of the vector sum V is $S = 2$.

For the position B ($\delta = 10°$), the measured vectors of the pulses from radiators 1.9 and 1.10 and their sums are shown in FIG. 2b. Since the pulses, radiated from different radiators, travel different distances to the receiver, the respective phases are different from each other, and the vectors have different directions. Each phase is shifted by the value $2\pi$ $d/\lambda$ sin $\delta$, i.e., for $\delta = 10°$ and $d = \lambda/2$, by 31° per radiator, and 250° for the radiator 1.0. The absolute value S of the vector sum V is $S = 1.92$.

FIG. 2c shows the measured vectors of the pulses from radiators 1.9 and 1.10 and their sum for the receiver position C ($\delta = 30°$). Here, the vectors are rotated by 90° from radiator to radiator. The absolute value S of this vector sum V is $S = 1.41$.

If a vector sum V were thus determined fro each azimuth $\delta$ by vector addition, the absolute values of the vector sums for all angles $\delta$, ploted against $\delta$, would yield a curve which is referred to here as a "virtual pattern." The term "virtual" expresses the fact that this pattern does not really exist in space. It is, however, identical to the real group pattern of FIG. 4, which is obtained if the radiators 1.9 and 1.10 of the linear antenna array of FIG. 1 were fed simultaneously and with equal magnitude and equal phase.

Now, the clearance sideband will be dealt with.

In that instance, the stored measured values corresponding to pulses received from the radiators 1.7 to 1.12 are evaluated. These measured values, excluding the two middle ones, are processed, not with the measured amplitude but with an amplitude decreasing (tapered) from the middle of the radiators toward the outside. The amplitudes of the radiators 1.7 to 1.12 are multiplied by the factor 1/5, and those of the radiators 1.8 and 1.11 by the factor 1/3. Since the twin-lobe pattern of the clearance sideband is to be simulated in the receiver, it is necessary that the phases of the measured values from one-half of the radiators, i.e., from the radiators 1.7 to 1.9, be shifted by 180°, or that their amplitudes be inverted. The vectors altered in this way are vectorially added, and the absolute value S of the vector sum V is formed.

In a manner similar to FIG. 2, FIGS. 3a to 3c show the vectors of the clearance sideband for the receiver position A, B and C of FIG. 1 along with the vector sums V. The conderations in connection with FIGS. 2a to 2c concerning the real group pattern and the virtual pattern apply analogously to FIGS. 3a to 3c.

In FIG. 4, the resulting curve is shown as a broken line and designated CS.

As explained hereinabove, the following two absolute values are formed so far:

$$S_{ct} = V_{ct} = Zn/2 + Zn/2 + 1$$

Eq. 1

$$S_{cs} = V_{cs} = -1/5\ Zn/2\ -2\ -1/3\ Zn/2\ -1\ -Zn/2 \\ +Zn/2\ +1\ +1/3\ Zn/2\ +2\ +1/5\ Zn/2\ +3$$

Eq. 2 where $Z$ ($\nu = 1...n$) is the vector which is derived from the measured values of the pulse from the $\nu$-th radiator, and $n$ is the number of radiators.

From these two absolute values, the indicated clearance value $\theta_c$ is now formed according to the equation $$\theta_c = (180/\pi)\ (\lambda/3\ \pi\ d)\ (S_{cs}/S_{ct}) = (120/\pi^2)\ (S_{cs}/S_{ct}).$$

Eq. 3

As shown in FIG. 4, the curves of $S_{cs}$ and $S_{ct}$ are chosen so that, when the aircraft is flying on-course ($\delta = 0$), the ratio $S_{cs}/S_{ct}$ has the value 0, and varies linearly in a sector on both sides of the course line $\delta = 0$. It is appropriate to multiply the ratio by a factor, so that the indicated value is identical (within a narrow sector on both sides of the course line $\delta = 0$) to the angular deviation of the receiver position from the said course line $\delta = 0$. In the present example, this factor is $(180/\pi)$ $(\lambda/3\ \pi\ d)$. By choosing another factor, it could also be achieved that the indicated clearance value would equal the difference in depth of modulation (DDM) which is a known criterion in connection with prior art ILS systems. If the course width is designed $\delta_b$ (this is that particular angular deviation in degrees from the course line $\delta = 0$ at which the DDM assumes the value 0.155), the new factor would be $(1.155/\delta_b)\ (180/\pi)\ (\lambda/3\ \pi\ d)$.

Then $$DDM = (0.155/\delta/\delta_b)\ (180/\pi)\ (\lambda/3\ \pi\ d)\ (S_{cs}/S_{ct}).$$

Eq. 3a

Figure 5:
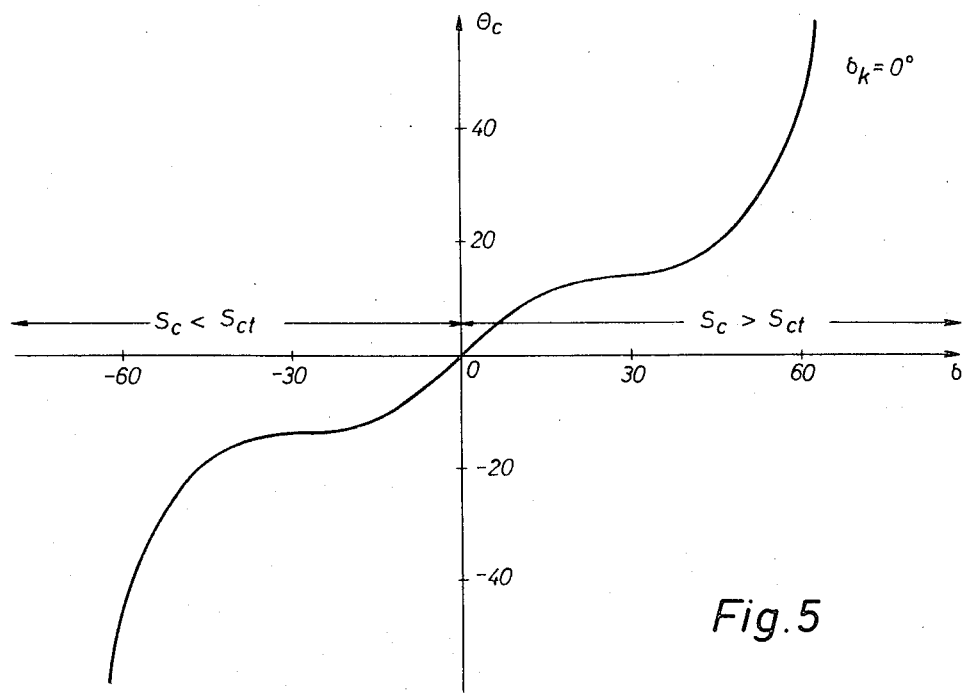
FIG. 5 shows the variation of the indicated clearance value derived from the patterns of FIG. 4.

Referring now to FIG. 5, the variation of $\theta$ as a function of the aircraft angular position $\delta$ is illustrated. This indicated clearance value $\theta$, derived in the clearance range, mainly serves to indicate the direction of the deviation from on-course, and it, therefore, provides a basis for making that determination.

The Equation 4, following, expresses the process mathmetically:

$$S_c = V_{ct} + i\ V_{cs}\ ,\ \text{where}\ (i^2 = -1).$$

Eq. 4

If $S_c > S_{ct}$, the receiver will be on one side of the course line, i.e., in the range of positive angles $\delta$; if $S_c > S_{ct}$, the receiver will be in the range of negative angles $\delta$. The determination of the indicated clearance value $\theta_c$ is effected continuously, in each case with new measured values as the airborne receiver station changes position.

If it is determined in the receiver that the indicated clearance value $\theta_c$ has reached a value which corresponds to an angle $\delta$ smaller than 3°, vector sums for the course carrier KT and the course sideband KS are formed in the receiver from the measured values in a manner similar to that described in connection with the clearance.

In this case, however, the vectors from the measured values of the pulses of all radiators are added vectorially. Prior to this vector addition, the amplitudes of all vectors are changed through multiplication by factors $i_{kt}$ for the course carrier and $i_{ks}$ for the course sideband. The factors for the vector Z are $$i_{kt} = 1 - 0.5\ \cos\ [(\nu - 1/2)\ 2\ \pi/n]$$

$$i_{ks} = 1 - 0.5\ \cos\ [(\nu - 1/2)\ 4\ \pi/n]$$

Since the course sideband is also a lobe pattern, the phases of the pulses of one-half of the radiators are again shifted by 180°, i.e., their amplitudes are inverted. The equations for the determination of the course carrier $S_{kt}$ and course sideband $S_{ks}$ are $$S_{kt} = |V_{kt}| = \left| \sum_{\nu=1}^{n} (i_{\nu kt})(Z_\nu) \right|$$

Eq 5

$$S_{ks} = |V_{ks}| = \sum_{\nu=1+(n/2)}^{n} (i_{\nu ks}) \left( Z_\nu - \sum_{\nu=1}^{n/2} i_{\nu ks} \right) (Z_\nu)$$

Eq. 6

Figure 6:
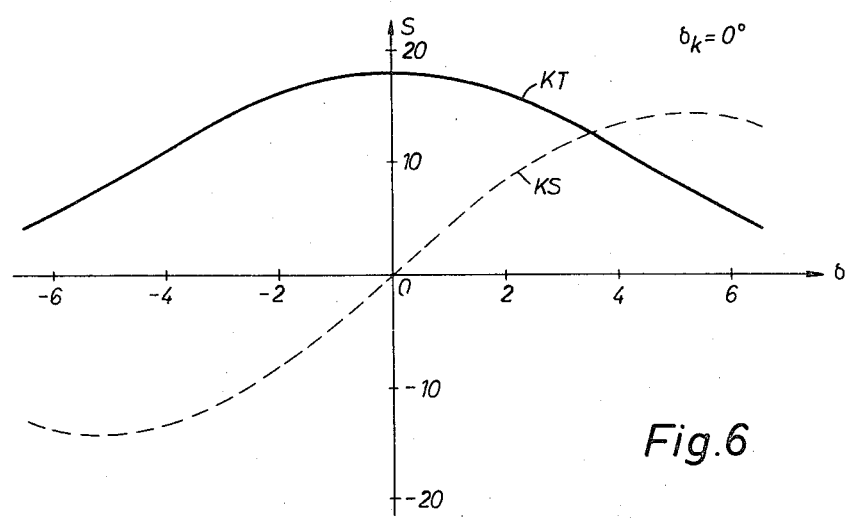
FIG. 6 shows the real group patterns of the course carrier and course sideband or the corresponding virtual patterns.
Figure 7:
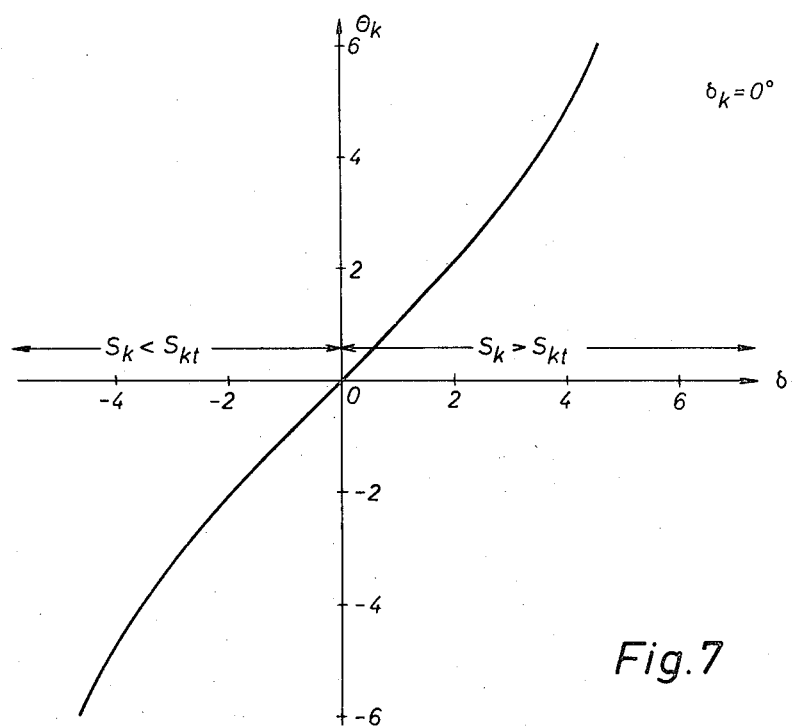
FIG. 7 shows the variation of the indicated course value derived from the patterns of FIG. 6.

If the absolute values of the two Equations 5 and 6 are determined for all angles $\delta$, the curves KT and KS of FIG. 6 are obtained. The considerations in connection with the curve CT of FIG. 4 concerning the real group pattern and the virtual pattern apply analogously to these curves of FIG. 6.

The indicated course value $\theta_k$ is determined from the absolute values of the two vector sums according to Equation 7, as follows:

$$\theta_k = 180/\pi\ 2\lambda/n\pi d\ S_{ks}/S_{kt} = 40/\pi^2 S_{ks}/S_{kt}$$

Eq. 7

Here, too, the factor $40/\pi^2$ is choosen so that, in a sector on both sides of the course line $\delta = 0$, the indicated course value $\theta_k$ is identical to the angular deviation of the receiver $\delta$ from the course line $\delta = 0$. It could also be achieved that the indicated course value is in agreement with the DDM. For that, it is necessary that $$DDM = 0.155/\delta_b \, 180/\pi 2\lambda/n\pi d$$

Eq. 7a

The sign, i.e., the direction of the indicated course value is determined by comparing Equation 8 (following) with $S_{kt}$.

$$S_k = V_{kt} + V_{ks}$$

Eq. 8

The indicated course value $\theta_k$ and its sign serves directly to control the deviation indicator in the aircraft. $\theta_k$ is determined continuously, always with new measured values, until the runway approach is finished. If it should become necessary to abort an actual landing and to go around again, changeover to clearance determination is effected as soon as $\theta_k$ assumes a value corresponding to $\delta < 3°$.

It can be shown that errors due to multipath propagation are equal irrespective of whether virtual patterns or real group patterns are used, provided that the patterns are equal. Therefore, the simulated (virtual) course-carrier and course-sideband patterns behave exactly like the corresponding real group pattern as far as the errors due to multipath propagation are concerned. In the real group patterns, the errors due to multipath propagation are composed of two portions. One portion is represented by the factors caused by the side lobes. The other portion is caused by the reflected clearance.

The second portion is of greater significance than the first. In using the virtual method, according to the invention, the second portion does not occur at all. This is of great significance in connection with the present invention. Another advantage of the virtual method is that the second linear ground beacon array is not required. Moreover, with the described virtual method, interaction between the antennas can be eliminated, since in each case, only a single radiator is in operation at any one time, all radiators can be almost completely isolated from each other. This is accomplished by inserting switched diodes into the antenna element feeders at suitable points. This expedient is not available in connection with real group patterns because there all elements radiate cooperatively to produce the group pattern.

The foregoing having been understood, a further improvement of the invention may now be described. This improvement allows the pilot of an approaching aircraft to select the approach angle in the air. Different approach angles are desirable particularly for the glide path because the most favorable glide path varies in accordance with each aircraft type. In the azimuth coordinate, different approach angles are also important for VTOL aircraft including helicopters, particularly in military uses.

Although prior art landing systems with selectable approach angle are known, they operate with constantly scanned group patterns or with fixed patterns of other types (such as interferometer patterns). From the ground station to the airborne station, the instantaneous angle must be constantly transmitted (in those scanning type arrangements) to identify the angle of the maximum of the group pattern continuously because no "fixing" information can be derived from the amplitude of only one field-strength measurement.

In the improvement of the present invention, it will be recalled that no constantly scanned ground beacon group patterns are used. These beam maximum angular identifications are formed virtually in the receiver (as if two equivalent group patterns had been actually rotated in the direction of the desired approach angle).

If the radiators of the linear array of FIG. 1 were simultaneously fed with equal amplitudes but instead of constant phase, with phases in accordance with $(\nu)(\alpha)$ (i.e., $\nu = 1 \ldots n$; $\alpha$ = constant phase value), real group patterns would be obtained in space which were rotated by an angle $\delta$ relative to those group patterns which radiate in the direction of the course line $\delta = 0$. This angle follows from the equation $$\delta = -\arcsin \alpha°/(360)(d/\lambda)$$

Eq. 9

In the present invention, that relationship is well known in the inertialess antenna scanning art because of the successive connection of the radiators, these rotated group patterns do not actually exist in space. However, rotated virtual patterns are formable according to the same theory aforementioned in connection with the basic unrotated virtual radiation patterns. Rotated group patterns or rotated virtual patterns have nearly the same shape as the unrotated patterns in FIGS. 4 and 6 but are shifted with respect to the $\delta$-axis.

To form the above-mentioned values in the receiver virtually, the phases $\psi$ of the stored measured values of the pulses of all radiators are modified by successive multiples of the angles $\alpha$; where $\alpha$ follows from the desired approach angle $\delta_k$ according to equation 10.

$$\alpha = (-2\pi)(d/\lambda)(\sin \delta_k)$$

Eq. 10

The modified phases $\psi'$ follow from the measured phases $\psi$ according to the equation $$\psi' = (\psi + \nu)[\alpha(\nu = 1 \ldots n)]$$

Eq. 11

Next, the values for the clearance carrier and clearance sideband are again determined according to equations 1 and 2. Instead of the measured vectors $Z$, the modified vectors $Z'$ with the modified phases are used.

Figure 8:
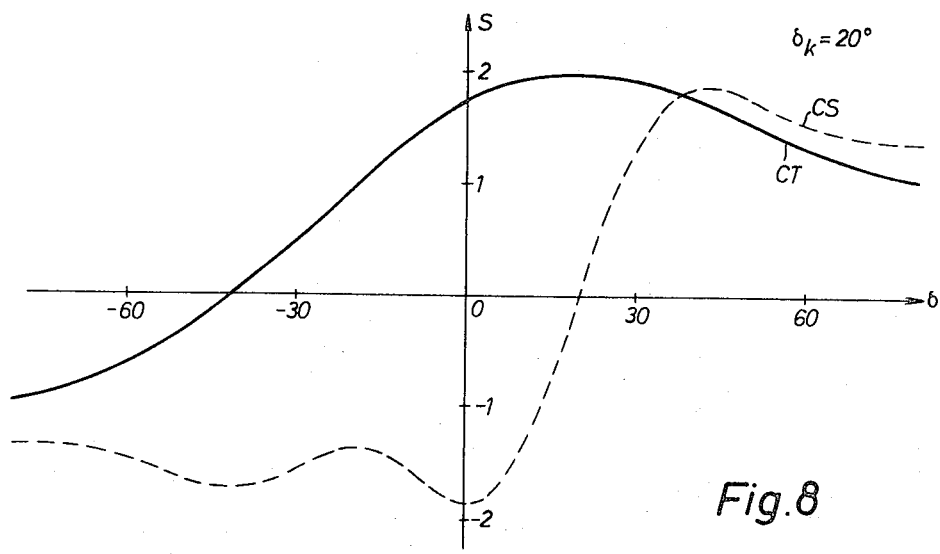
FIGS. 8 to 11 shows the patterns corresponding to the patterns of FIGS. 4 to 7 at a selected angle $\delta_k = 20°$.

FIG. 8 shows the resulting virtual pattern for an approach angle $\delta_k = 20°$. The clearance-carrier pattern is against designated CT, and the clearance-sideband pattern CS.

Figure 9:
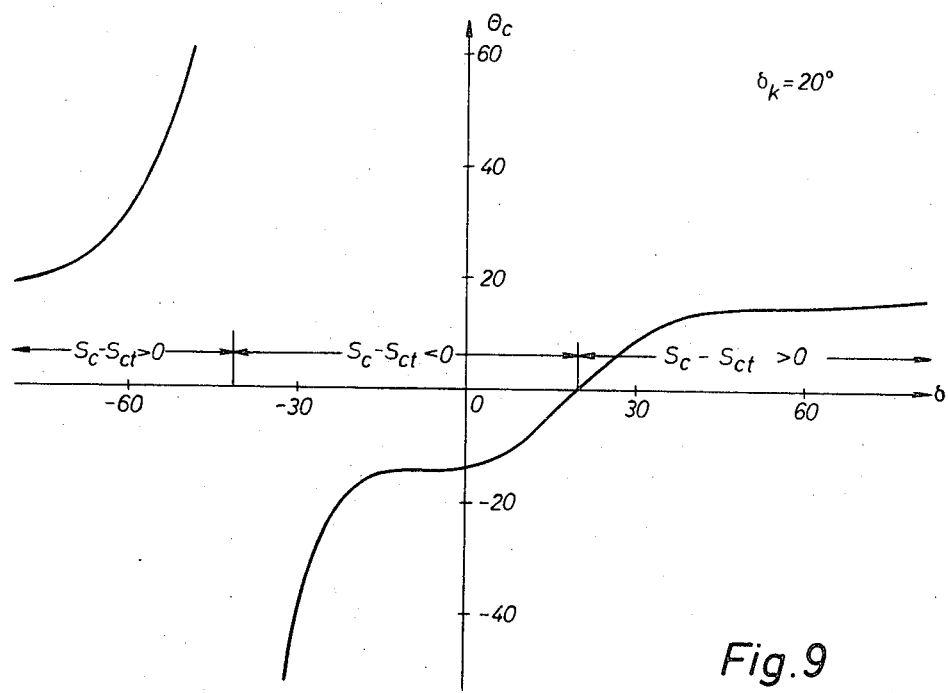

FIG. 9 shows the associated indicated clearance value $\theta_c$, which has been determined according to equation 3.

As can be seen in FIG. 9, the sign of $(S_c - S_{ct})$ is not sufficient for an unambiguous decision on the direction of the deviation. In the case being considered here, $\delta_k = 20°$, it follows from $(S_c - S_{ct}) < 0$, that the receiver is in the sector $\delta_y < \delta < \delta_k$, where $\delta_y$ is obtainable from the equation $$\sin \delta_y = \sin \delta_k - 1/2 \ d/\lambda$$

Eq. 12

From this it follows unambiguously that $\delta < \delta_k$, but if (assuming that $\delta_k$ is still $< 0$) the expression $(S_c - S_{ct}) < 0$, $\delta$ may be either $> \delta_k$ or $< \delta_y$. Thus, for the time being, no unambiguous statement is possible as to whether $\delta$ is greater or less than $\delta_k$. By an additional calculation in the receiver, however, this question can be settled unambiguously. The calculation of $S_{ct}$ and $S_c$ according to equations 1 and 3 must also be carried out for $\alpha = 0$. The signs of $S_c - S_{ct}$, on the one hand for $\alpha = 0$, and on the other hand for $\alpha = (-2\pi d/\lambda) (\sin \delta_k)$, determine unambiguously the direction of the deviation. A distinction must be made between two cases, depending on the sign of $\delta_k$. If $\delta_k > 0$, then $\delta > \delta_k$ provided that both signs are positive; otherwise, $\delta < \delta_k$. If $\delta_k < 0$, then $\delta > \delta_k$ provided that both signs are negative; otherwise, $\delta > \delta_k$. Thus, the sign of $\theta_c$ (equation 3) can be fixed unambiguously.

The receiver remains set for clearance determination if $\theta_c > 3°$, and only the direction of the deviation from the selected course $\delta_k$ is delivered for indication.

Figure 10:
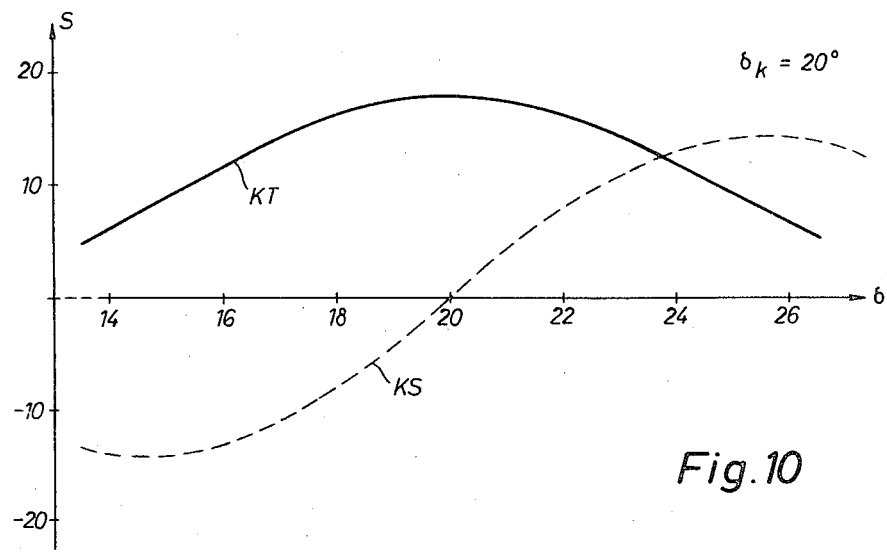

As soon as $\theta_c > 3°$, the receiver changes over to course determination, and the course carrier and the course sideband are now determined according to equations 5 and 6, with the modified phases being used again. The resulting virtual patterns are shown in FIG. 10.

The indicated course value is determined from the absolute values of the two vector sums according to the following equation:

$$\theta_k = (1/\cos \delta_k) (40/\pi 2) (S_{ks}/S_{kt})$$

Eq. 7b

Figure 11:
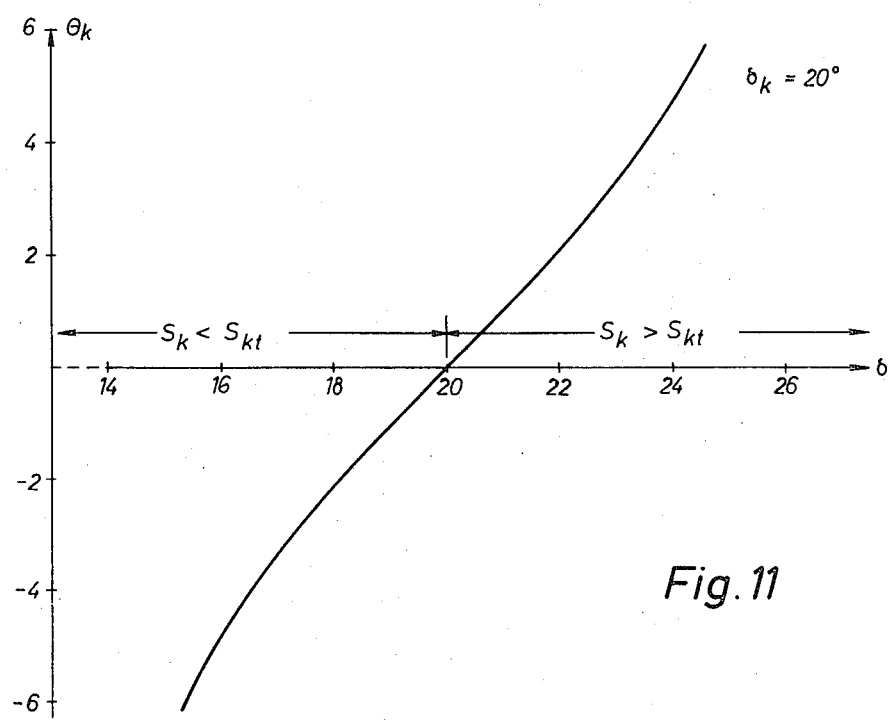

The sign of $\theta_k$ is derived from equation 8. In a narrow sector of $\pm 1.5°$ on both sides of the set course line, the indicated course value is equal to the receiver's deviation in angular degrees from this course line, and is indicated directly. Its variation is shown in FIG. 11.

The mode of operation in the receiver can also be conceived as follows: With the change of the vectors by the angle $\nu$, the virtual points originally lying on the virtual patterns for $\delta$ 32 0° and associated with the direction of reception shift to the corresponding virtual points of the rotated virtual patterns, i.e., the field strengths are determined which would be present if the patterns had been rotated in the direction of the selected course angle.

In the basic form of the system according to the invention, the approach angle is rigidly fixed, and the deviation of the receiver from on-course is indicated only in a narrow sector on both sides of the course line. In the first improvement described, the course $\delta_k$ is selectable by introduction of the phase change by a constant angle. The selection of the course must be entered by the user of the receiver, i.e., pilot or navigator of approaching aircraft. But here, too, accurate determination of the direction is possible only near the set course line.

A second variation, constituting another improvement will now be described. In this version, angle $\alpha$ can assume different values, and enables the airborne determination of azimuth over a greater angular sector. In this case, only the processing of the number couples in the receiver is changed, while the ground installation and the measuring unit of the receiver remain unchanged.

After the turn-on, the receiver first operates in the search mode. In this mode, the clearance is determined according to equations 1 to 3, first with $\alpha = 0$. Depending on the azimuth of the receiver, a positive or a negative value of $\theta_c$ is obtained (FIG. 5) whenever $\theta_c < 2°$, the search mode is terminated, and changeover to the course patterns is effected. If a value $\theta_c < 2°$ is obtained, however, the sign of $(\theta_c)$ decides on the further signal processing. The clearance is repeated for a new value of the angle $\alpha$, namely $$\alpha = \alpha_1 = [-(\theta_c)] \ (6°)$$

Figure 12:
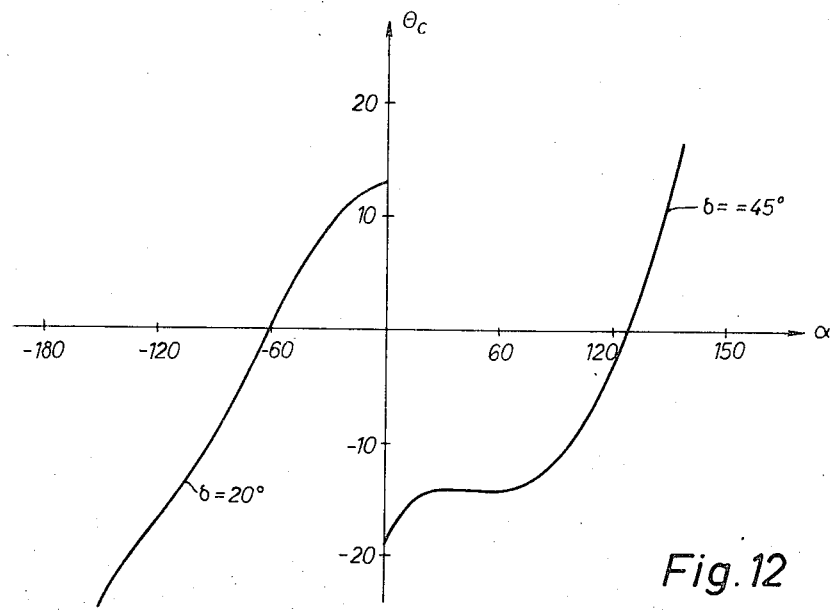
FIG. 12 shows the variation of the indicated clearance value for the aircraft position $\delta = 20°$ and $\delta = -45°$ as a function of the angle $\delta$.

The number 6° is chosen so that, for the new calculation, the course $\delta_k$ is shifted by about 2° in the direction of the receiver position. The result $\theta_c (\alpha_1)$ must again be checked as to whether its value is smaller than 2°. If the result of the check is afirmative, the search operation is considered completed and changeover to the course mode is effected. If the result is negative, the operation is repeated with $\alpha = (2) (\alpha_1)$. This is continued with $\alpha = (3) (60_1); \alpha = (4) (\alpha_1)$, etc., until the value of $\theta_c (\alpha)$ is found to remain below 2°. Then, changeover to the course mode is effected. FIG. 12 shows how the search mode works. In a first example, the receiver position is chosen to be $\delta = 20°$, and in a second example, it is $\delta = -45°$. For $\delta = 20°$, the first calculation ($\alpha = 0°$) provides the result $\delta_c (0) = 13.20$. Hence, the calculation must be continued with $\alpha = -6°, -12°, -18°$, etc. Only the calculation with $\alpha = -60°$ provides a result whose value is lower than 2°, namely, $\theta_c (-60) = \mathbf{0.528}$. For a receiver at the azimuth $\delta = -45°$, the first calculation ($\alpha = 0$) determines the directional information $\theta_c(0) = -19.156$. Hence, the further calculations must be carried out with $\alpha = 6°, 12°$, etc. Only the calculation with $\alpha = 126°$ provides a result whose absolute value is lower than 2°, namely, $\theta_c (126) = -0.570$. Now, the receiver switches to course mode.

The purpose of the search mode was to obtain a course value for $\alpha$, so that the associated value of $\alpha_c$ becomes smaller than 2. If the course mode is carried out with this $\alpha$, it is insured that the receiver is located in a sector close to the main lobes of the virtual course patterns. In a second step, the value $\delta_k$ is determined from $\alpha$ according to equation 10. Then, the relationship $$\delta = \delta_k + \theta$$

Eq. 12 represents a good approximate value for the azimuth of the receiver. However, since the curve $\theta_k$ is not strictly linear within the range $\pm 2°$ on both sides of $\theta_k$, as shown in FIG. 5, $\delta$ is not yet safely the accurate value. Therefore, the calculation of equation 13

$$\alpha = (-2\pi) (d/\lambda) (\sin \delta)$$

Eq. 13 is performed, and the course mode is carried out a second time for this new phase increment $\alpha$. This results in a new $\theta_k$; the value of which lies in the linear region of the curve $\theta_k$. The azimuth $\delta$ of the receiver can now be determined from equation 9.

Even if the receiver is in a fast-flying aircraft, it nevertheless changes of position between successive antenna cycles is minimal since the cycles follow in rapid succession. If the position $\delta$ has been accurately determined for a scanning cycle, this value can serve as a basis for the evaluation during the next cycle. To this end, the receiver determines $\alpha$ from equation 13 and operates in the course mode, with only the vectors in the buffer store being different from before because they emanate from the new cycle. The result of the calculation is $\theta_k$. If this is added to the old value $\delta$, a new azimuth $\delta$ is obtained. Thus, the search mode need not be repeated each time, but the course patterns can, so to speak, be identified with the receiver and tracked thereto when the receiver changes its position.

As the receiver effects tracking of the directional virtual course patterns to its position, any sources of radio noise which lie in the range of the side lobes produce very reduced measurement errors resulting from multipath propagation.

Figure 13:
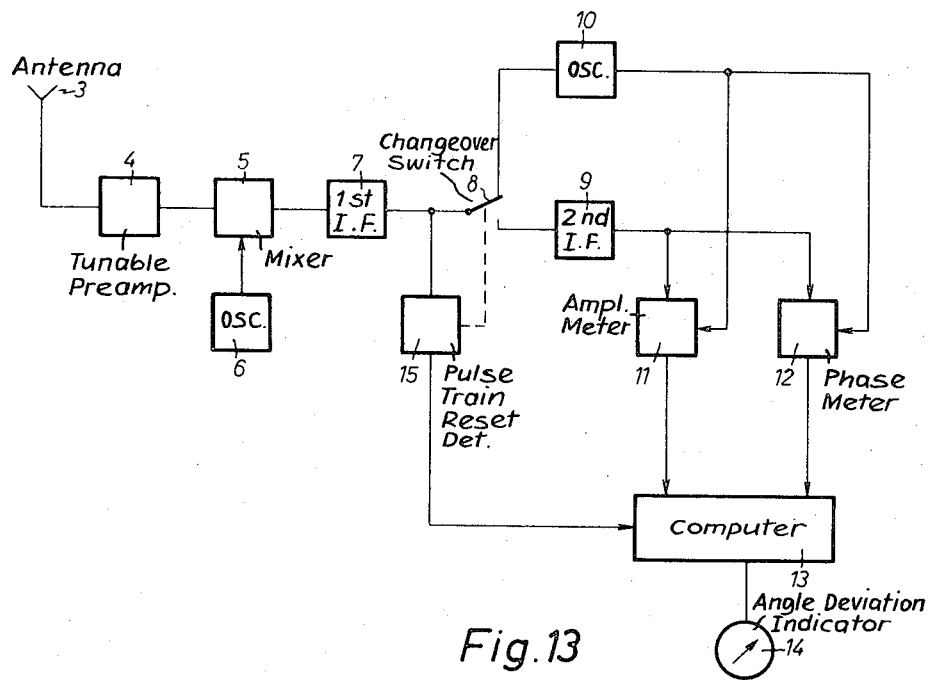
FIG. 13 shows a block diagram of a typical airborne receiver used in the system of the present inventor.

Following is a description of the typical block diagram (FIG. 13) of the receiver for use with the system of the present invention.

The r.f. pulses are received by an antenna 3; from there, they are applied through a tunable preamplifier 4 to the mixer 5. The mixer also receives an r.f. oscillation from an oscillator 6. The output of the mixer 5 is connected to a first I.F. unit 7. This I.F. unit is followed by a change-over switch 8, which, in the position shown, connects this first I.F. to an oscillator 10. If the changeover switch 8 is in the other position, the first i.f. unit is connected to a second I.F. unit 9, to whose output are connected an amplitude meter 11 and a phase meter 12. The output of oscillator 10 is connected to the second inputs of the amplitude meter 11 and the phase meter 12. The outputs of the meters 11 and 12 are connected to a computer 13, whose output is connected to the course deviation indicator and, if desired, to an indicator for azimuth or elevation.

Also connected to the output of the first I.F. unit 7 is a device 15 (pulse train reset detector) for recognizing the pulse train and for actuating the changeover switch 8 and to reset computer 13. When the device 15 recognizes the pulse train, it sends a signal to the computer 13 and puts the changeover switch into the position shown, so that the subsequent pulse from the first radiator is applied to the highly accurate oscillator 10, to synchronize the latter with respect to amplitude and phase. Such oscillators are substantially the same as the so-called CO40 of an MTI radar system in that respect.

After the first pulse, the changeover switch 8 is changed to the other position so that the following pulses are applied through the second I.F. unit 9 to the meters 11 and 12.

The phase and the amplitude of the output signal of oscillator 10 are the measured quantities of the reference (first pulse) in the ground beacon antenna commutation cycles, and serve as reference quantities for the measurement of the phases and amplitudes of the pulses from the second to the ($n$)th radiator. The amplitude and phase meters are known per se and, therefore, need not be explained here in detail.

The phase values $\psi$ and the amplitude values A ($\nu = 1 \ldots n$) may be stored in the storages of the computer or in a separate storage at the storage location $\nu$. The writing is controlled by a counter which is advanced at the same rate as that of the connection of the radiators of the linear antenna array and, when the pulse train appears, is restored to its initial position. That counter is of a known type per se, and its use in a computing arrangement of the type required is a common expedient.

From the amplitude values A and the phase values $\psi$, the computer now determines the indicated clearance and course values $\theta_c$ and $\theta_k$ as described above.

What is claimed is:

1. A radiolocation system particularly adapted for aircraft guidance in a terminal area and providing an ILS type presentation of air-derived angular guidance information based on group beacon tramsmissions, which includes a linear array of N substantially identical and substantially equally spaced radiators sequentially and cyclically energized from a transmitter producing signals of substantially constant phase and amplitude, said ground beacon also being arranged to transmit a pulse train prior to each ground beacon radiation cycle, said ground beacon transmitting a reference signal to facilitate remote phase measurements, comprising:
   a receiver located on said aircraft, said receiver including means responsive to said pulse train for determining the beginning of a ground beacon commutation cycle;
   means within said receiver for comparing the amplitude and phase of said reference signal with the amplitude and phase of energy received from each radiator of said ground beacon array energized, to produce a plurality of measured amplitude and phase values;
   means for adding said measured values vectorially to form a first vector sum;
   means for determining the absolute value of said first sum to produce a value representative of the field strength which a group antenna pattern with a single main lobe would produce along a directional line perpendicular to said linear array at the location of said receiver;
   means for shifting one half of the measured values by 180° in phase.
   means responsive to said phase shifted measured values and the balance of said measured values in unmodified form for deriving a second vector sum, and for producing the absolute value thereof, said second vector sum absolute value characterizing a double-lobe group pattern with null on said directional line perpendicular to said linear array;
   and means for taking the quotient of said first and said second vector sum absolute values for producing a signal having the same variational characteristics about said directional line perpendicular to said linear array as is produced by an ILS system.

2. Apparatus according to claim 1 further defined in that additional means are included for restricting the measured values used to those corresponding to less than all of the radiators of said ground beacon array and those used are the ones closest to the central region of said array.

3. Apparatus according to claim 2 including means for changing the direction of approach angle by shifting the phases of said measured values before determination of said vector sums, said shifting of the first of a group of measured values being by an angle $\alpha$, the second by $2\alpha$, the third by $3\alpha$, etc., to $n\alpha$.

* * * * *